United States Patent
Maiden

(10) Patent No.: US 7,713,483 B2
(45) Date of Patent: May 11, 2010

(54) PORTABLE FILTER CAP

(75) Inventor: Miles Maiden, Blue Hill, ME (US)

(73) Assignee: Hydro-Photon, Inc., Blue Hill, ME (US)

( * ) Notice: Subject to any disclaimer, the term of this patent is extended or adjusted under 35 U.S.C. 154(b) by 1066 days.

(21) Appl. No.: 11/068,417

(22) Filed: Feb. 28, 2005

(65) Prior Publication Data

US 2005/0189290 A1 Sep. 1, 2005

Related U.S. Application Data

(60) Provisional application No. 60/548,974, filed on Mar. 1, 2004, provisional application No. 60/573,209, filed on May 21, 2004.

(51) Int. Cl.
*B01L 99/00* (2010.01)
(52) U.S. Cl. ..................................... 422/101
(58) Field of Classification Search ................. 422/101; 210/238, 474, 472
See application file for complete search history.

(56) References Cited

U.S. PATENT DOCUMENTS

| | | | |
|---|---|---|---|
| 5,681,463 A * | 10/1997 | Shimizu et al. ............. | 210/266 |
| 6,395,170 B1 | 5/2002 | Hughes et al. | |
| 6,548,134 B1 * | 4/2003 | Rogers ....................... | 428/35.7 |
| 6,569,329 B1 | 5/2003 | Nohren, Jr. | |
| 6,733,669 B1 | 5/2004 | Crick | |

* cited by examiner

*Primary Examiner*—Walter D Griffin
*Assistant Examiner*—Bobby Ramdhanie
(74) *Attorney, Agent, or Firm*—Cesari and McKenna, LLP; Patricia A. Sheehan

(57) ABSTRACT

A portable water filtration system filters water as it flows through an inlet of a conventional storage container and removes impurities before they enter the container. The filtration system is implemented within a cap that can attach to a variety of standard water storage containers, such as Nalgene™-type water bottles. When attached to the storage container, the cap seals around the container inlet and prevents the outer surface of the container inlet from contacting the water. To that end, two watertight seals are formed to isolate the outer surface of the inlet from any fluid communication, e.g., during a water-filling process. Because the outer surface of the inlet does not contact the unfiltered water, no contaminants can adhere to the inlet's surface and threaten a drinker's health if he/she drinks directly from the storage container after the cap is removed. The filtration system may be detachable from the base, such that the filtration system can be removed while the filtered water is disinfected using known ultra-violet (UV) and chemicals. In one embodiment, the filtration system may be cleaned and reinserted in an opposite orientation to seal the filtered and treated water in the container.

28 Claims, 12 Drawing Sheets

PORTABLE FILTER CAP

CROSS-REFERENCE TO RELATED APPLICATIONS

The present application claims the benefit of U.S. Provisional Patent Application Ser. No. 60/548,974, entitled Portable Filter Cap, which was filed on Mar. 1, 2004, by Miles Maiden and is hereby incorporated by reference as though fully set forth herein.

The present application also claims the benefit of U.S. Provisional Patent Application Ser. No. 60/573,209, entitled Portable Filter Cap, which was filed on May 21, 2004, by Miles Maiden and is hereby incorporated by reference as though fully set forth herein.

FIELD OF THE INVENTION

This invention relates generally to water filtration systems, and, more specifically, to a bottle cap or the like having an integrated water filtration system.

BACKGROUND OF THE INVENTION

Often, it is unsafe to consume water acquired from a naturally occurring fresh water source, such as a stream, lake or river. In some areas, fresh water also may be tainted by the local plumbing or water treatment facilities. In particular, the water may contain various inorganic or biological contaminants that may be hazardous to those who drink it. For example, the water may contain harmful heavy metals, minerals and soil sediment as well as bacteria, viruses, algae and so forth. It is therefore important for hikers, campers, travelers, etc. to remove these impurities from water obtained from untrusted sources.

Drinking water is typically collected from a water source and stored in a conventional storage container, such as a canteen or standard Nalgene™-type bottle. Portable water purification systems are currently available for purifying water within these storage containers. Such purification systems usually employ filtration systems and/or chemical or irradiative treatments to eliminate contaminants. For instance, the water may be disinfected by chlorine, hydrogen peroxide, iodine or ultra-violet (UV) radiation applied within the bottle or canteen. In addition, as the water is extracted from the bottle or canteen, the water may be passed through a mesh filter to remove larger particulates, such as heavy metals and the like.

The previous purification techniques decontaminate water stored within the water storage container, however, they do not prevent contamination of the outside of the container during the water-filling process. More specifically, people often drink directly from an opening, e.g., at the end of a protruding "neck" or inlet on the storage container, and are therefore susceptible to any contaminants that have adhered to the outside surface of the opening. As a result, the health of a hiker, camper, traveler, etc. may be put at risk by untreated water on the outside of the storage container even after the water stored inside the container has been decontaminated by conventional techniques.

The prior storage container water purification systems that employ filtration systems further suffer the disadvantage that "dirty" water is stored directly in the water storage container, with the filtering occurring as the water is extracted. Consequently, the inside of the container may have to be periodically cleaned to remove any waste build up that has collected therein.

SUMMARY OF THE INVENTION

The present invention is a portable water filtration system that filters water as the water flows through an inlet of a conventional storage container and at the same time isolates the outside of the inlet from the water. The filtration system, which removes impurities from the water before the water enters the container, is implemented within a cap that can attach to a variety of standard water storage containers, such as Nalgene™-type water bottles. When attached to the storage container, the cap seals around the container inlet and prevents the outer surface of the container inlet from contacting the water. Preferably, the cap threadingly engages with the outer surface of the inlet. Once the cap is fitted over the inlet, a filter integrated with the cap, either as a removable insert or as an integral part thereof, filters water that flows through the inlet and into the body of the storage container.

The cap includes a "soft ring," such as a rubberized O-ring, that forms a watertight pressure seal against a flange positioned near the base of the inlet when the cap is in place over the inlet. The soft ring thus prevents the water from contacting the outer surface of the inlet, even if the inlet is submerged (or partly submerged) in the untrusted water source. The cap also includes a second ring that forms a watertight seal with the top surface of the inlet, thereby preventing water within the storage container from contaminating the outer surface of the inlet. As such, the outer surface of the inlet is isolated from any fluid communication with the untreated water during the water-filling process.

Advantageously, the portable water filtration system is compact and may be easily transported while attached to the water storage container, or, alternatively, may be transported as a separate unit. In addition, the filtration system is compatible with conventional UV and chemical water treatments for removing biological contaminants. The filtration system may be employed for various recreational, commercial or military uses.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 1A:
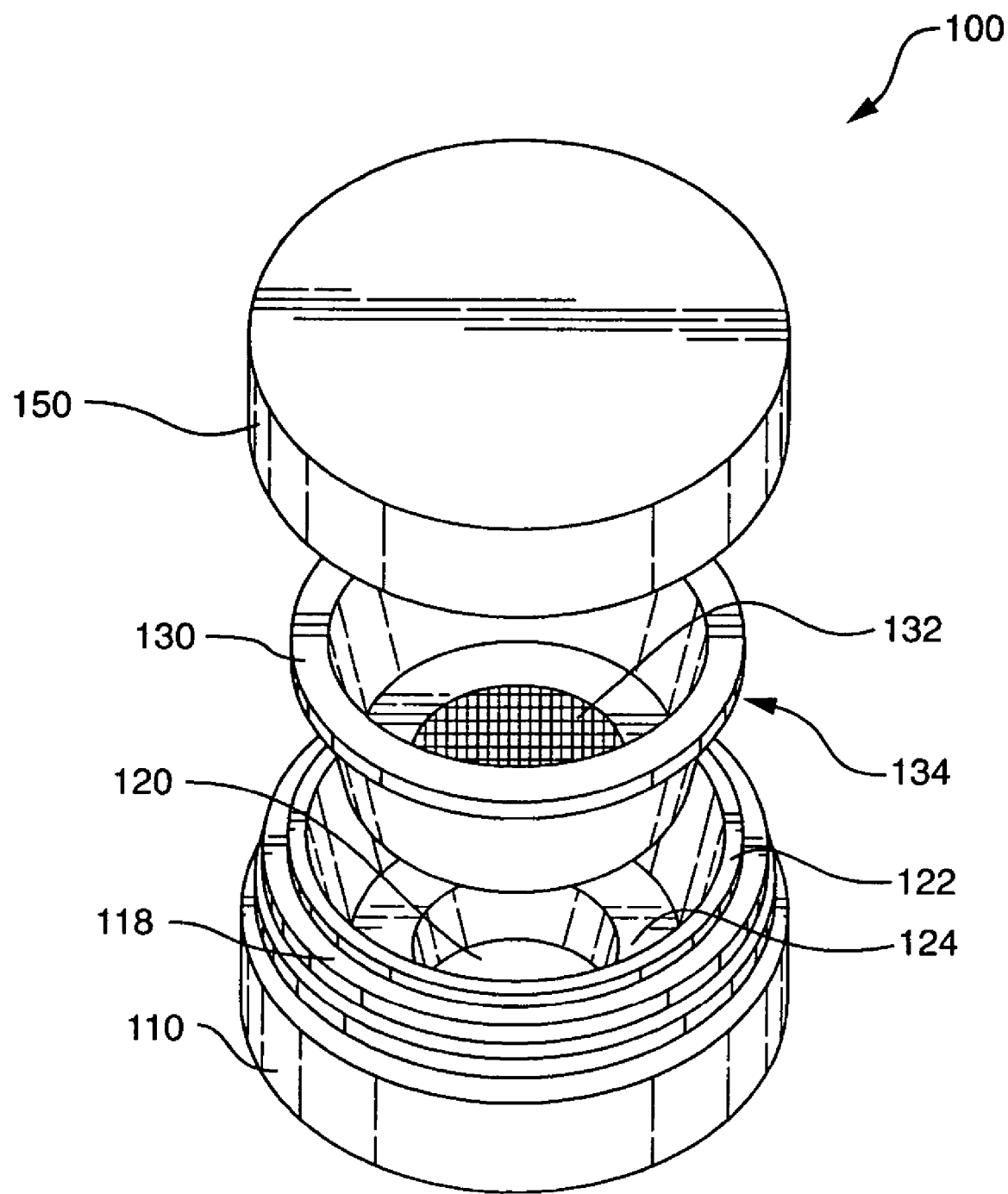
FIG. 1A is an oblique top view of a base, filter and cover that collectively may be used to assemble the cap of the present invention in accordance with an illustrative embodiment.

FIG. 1A illustrates an exemplary portable cap 100 that is adapted to attach to a variety of conventional water storage containers, such as Nalgene™-type water bottles. The cap 100 includes an integrated water filtering system, which is illustratively embodied as a filter 130 that interfaces with a base 110. The base 110 also receives a conventional bottle cover 150, as discussed in more detail below with reference to FIG. 1C. The cap's base and filter components are preferably constructed as single pieces of molded plastic. The base 110 is adapted to attach to a standard inlet (not shown) through which water enters or leaves the water storage container, with center hole 120 positioned to allow water to flow into and out of the storage container through the inlet. Preferably, the base 110 is threadingly attached to the inlet.

Figure 1B:
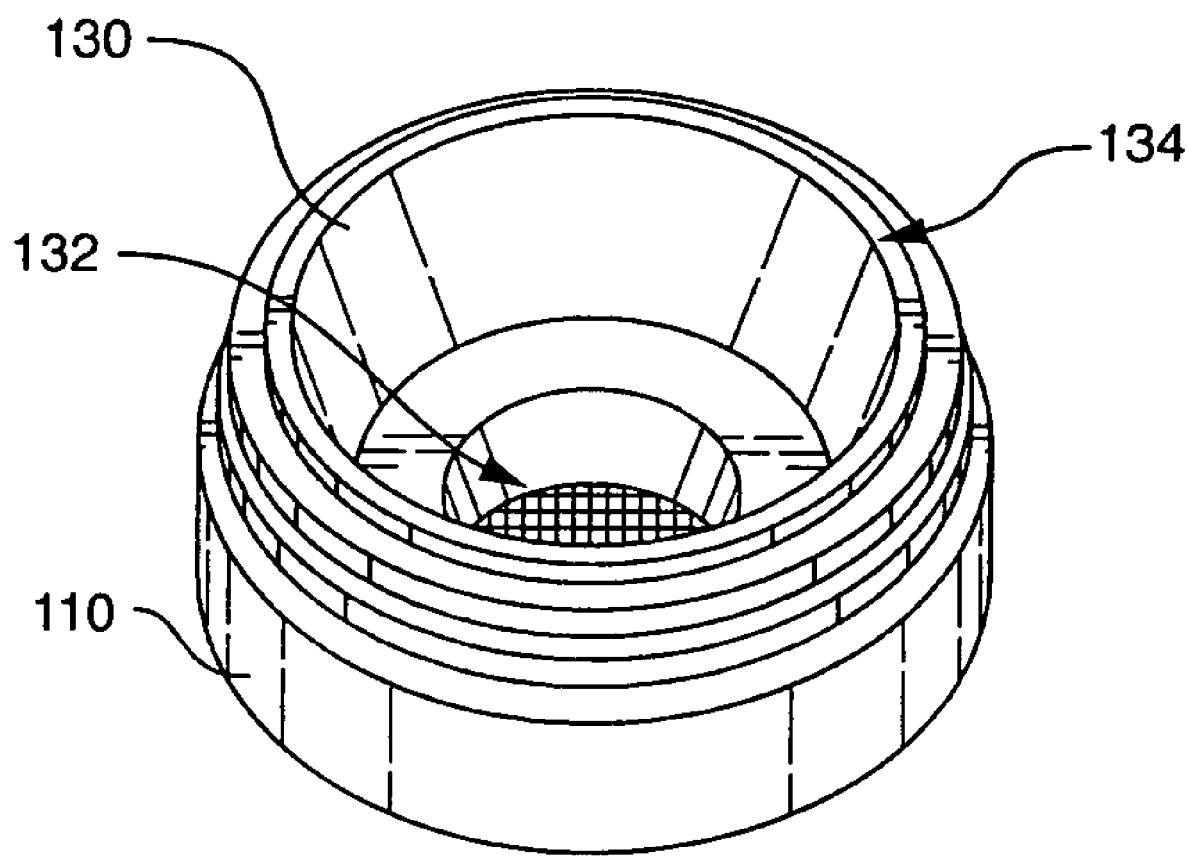
FIG. 1B is an oblique top view of the illustrative base and filter that may be used to assemble the cap of FIG. 1A.

The filter 130 is constructed to fit within the base 110. Illustratively, a rim 134 around the circumference of the filter rests upon the top surface 122 of the base 110. For additional support, the filter 130 also may be seated on a ridge 124 molded into the base 110. As shown, the weight of the filter secures it within the base. However, it is also contemplated that securing means, such as clamps or adhesives, may be used to secure the filter within the base. Moreover, in an alternative embodiment, the filter 130 is not a separate component of the cap 100, and instead is directly incorporated (e.g., molded) into the base 110. FIG. 1B illustrates the filter 130 seated within the base 110.

When properly positioned within the base 110, a mesh 132 in the filter 130 is aligned with the hole 120. The mesh contains holes that are sized to block relatively large particulates, such as heavy metals, dirt, etc., as water passes through the filter 130 and into the storage container. The mesh size may, however, permit relatively small bacteria, viruses and the like to pass through. The mesh may be constructed from various materials, such as plastic or metal strands, and may be molded, embedded or otherwise secured within the bottom surface of the filter 130 by conventional means known in the art.

Figure 1C:
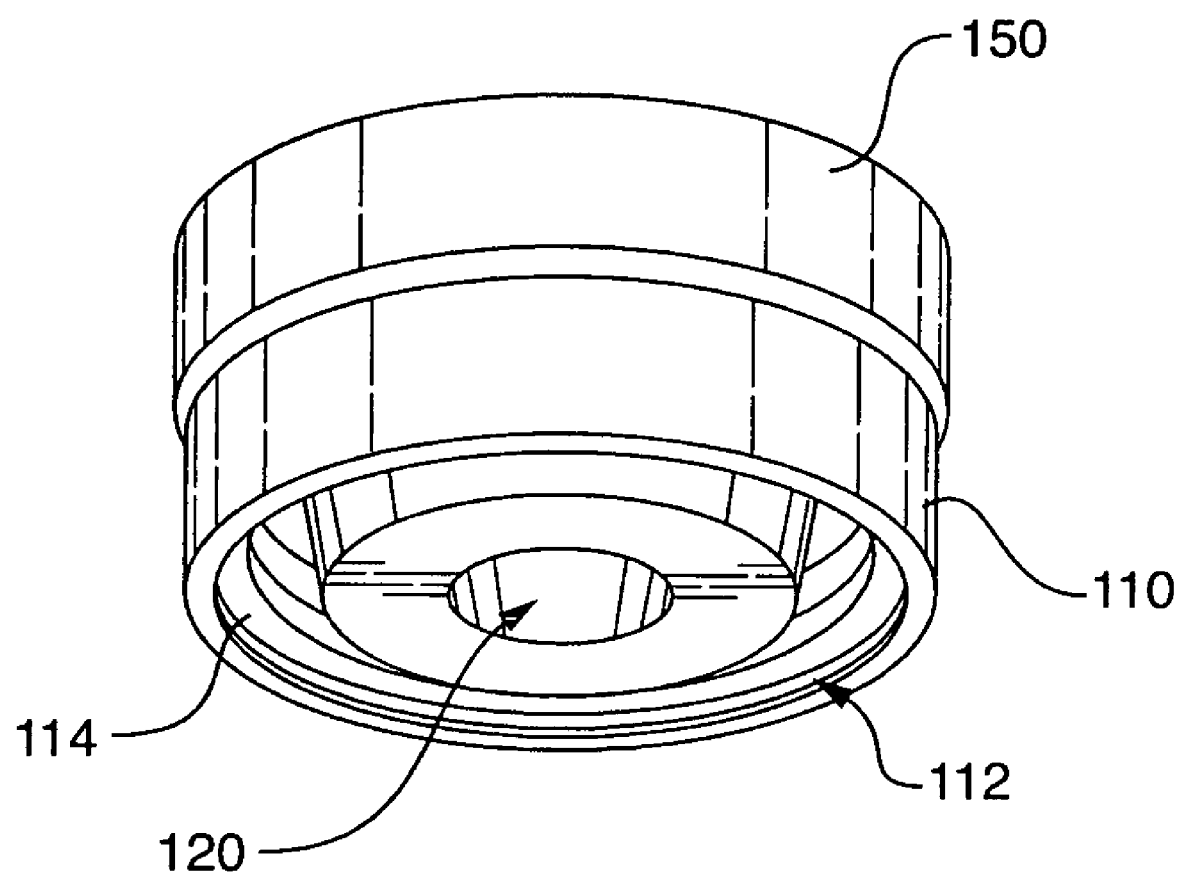
FIG. 1C is an oblique bottom view of the assembled cap in accordance with the illustrative embodiment.

FIG. 1C illustrates the cap 100 with the cover 150 secured to the base 110. The cover includes threads (not shown) that engage with the threads 118 on the outer surface of the base. The cap 100 may be stored compactly by securing the cover 150 over the base 110. Further, the filter 130 may be "sandwiched" between the cover and the base for easy storage. The bottom of the base 110 comprises threads 114 that engage with threads (not shown) located on the outer surface of an inlet of a conventional water storage container. Thus, the cap 100 may be secured to the storage container by screwing the base 110 onto the inlet, placing the filter 130 within the base, positioning the cover 150 over the filter and tightening the cover to the base. A "soft ring" 112, such as a rubberized O-ring, may be positioned, e.g., in a groove, along the perimeter of the underside of the base 110, to form a seal with a surface of the inlet or the bottle as discussed below with reference to FIGS. 2A-B.

Figure 2A:
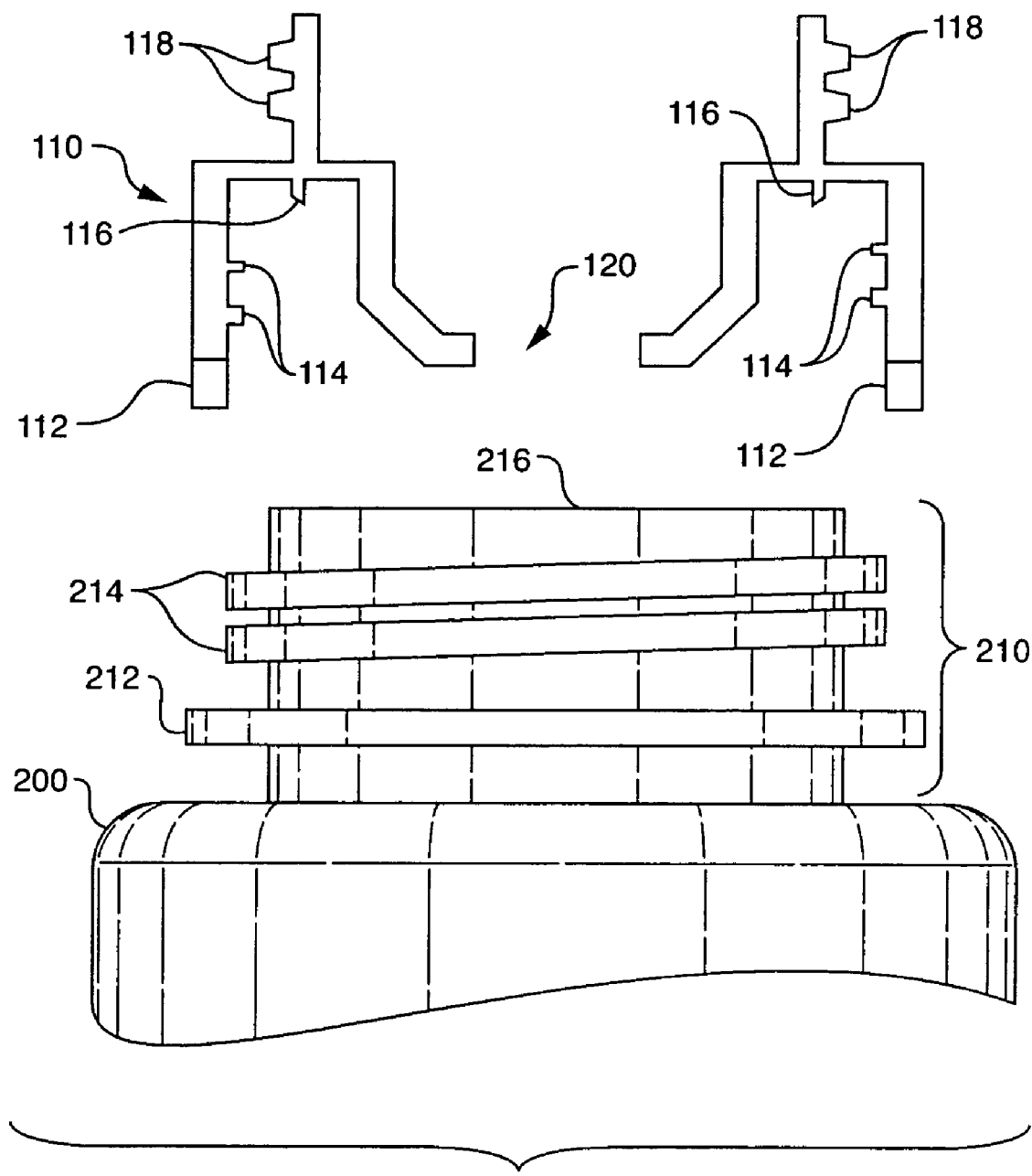
FIG. 2A is a cut away cross-sectional view of the illustrative base and a conventional water storage container.

FIG. 2A illustrates a cross-sectional view of the illustrative base 110 and a conventional water storage container 200 having an inlet 210 through which water can enter and exit the body of the container. The inlet includes a flange 212 that extends around the circumference of the inlet 210. The flange is near the bottom of the inlet, i.e., relatively close to the body of the container 200. The outer surface of the inlet contains one or more threads 214 which engage the threads 114 on the base 110. Accordingly, the base may be threaded onto the inlet, until the soft ring 112 forms a watertight pressure seal against the flange 212. A ring 116, e.g., molded on the base 110, forms a second watertight pressure seal with the inlet's top surface 216 while the base is attached. In this manner, the watertight seals formed by the rings 112 and 116 isolate the outer surface of the inlet 210, including the threads 214, from the untreated water.

Figure 2B:
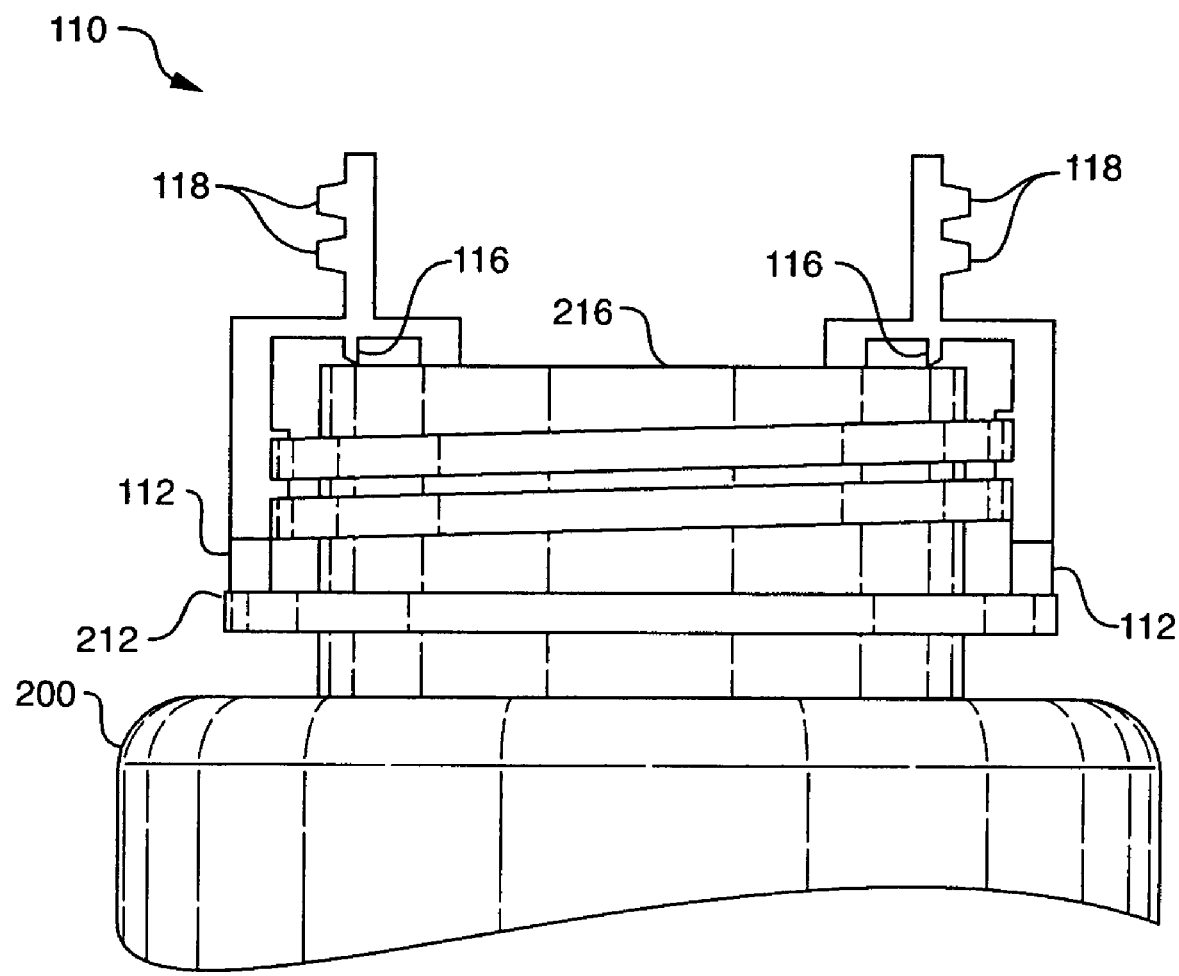
FIG. 2B is a cut away cross-sectional view of the illustrative base engaged with the water storage container of FIG. 2A.

FIG. 2B illustrates the base 110 attached to the inlet 210. The storage container 200 may be filled with water that flows through the hole 120 in the base 110. The filter 130 may be seated within the base so only filtered water enters the body of the container. In this case, the mesh 132 entraps impurities, such as heavy metals and sediment, as water enters the container 200.

Figure 3:
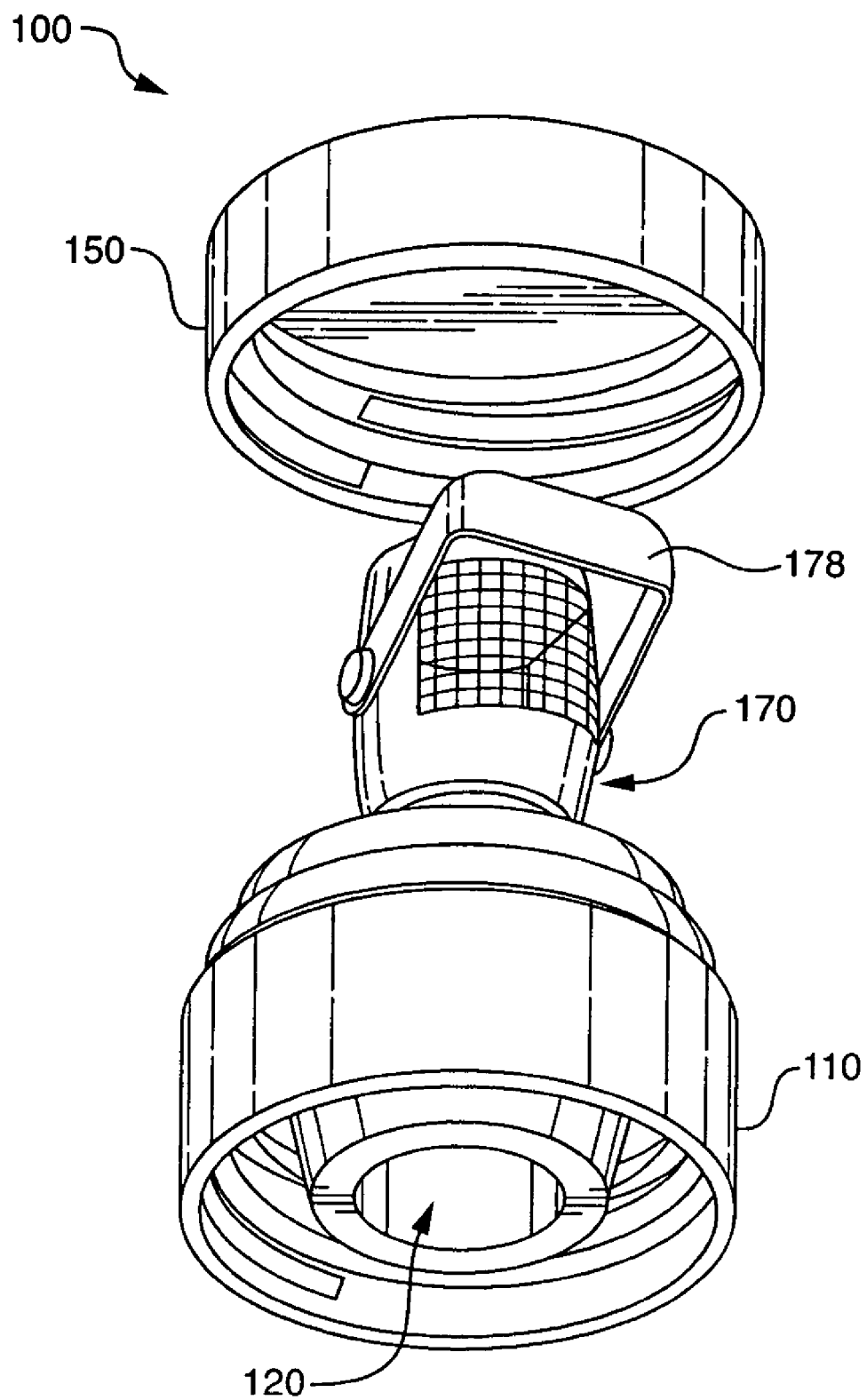
FIG. 3 is an oblique bottom view of a cap assembled in accordance with another illustrative embodiment of the present invention, the cap including the illustrative base and cover shown in FIGS. 1A-C.

FIG. 3 illustrates another embodiment of the cap 100. The cap includes a removable filter 170 adapted to be positioned between the base 110 and the conventional Nalgene™-type cover 150. Illustratively, the filter 170 can be placed within the base in two possible orientations: a first orientation that permits water to flow through the filter and into the hole 120 and a second orientation that essentially "closes" the hole 120, thereby preventing water from passing through the base. As shown, the filter may be switched from one orientation to the other by rotating the filter 180 degrees (see FIGS. 5A-B below). To facilitate the rotation between the different orientations, the filter 170 includes a handle 178 by which the filter can be removed from the base 110.

Figure 4A:
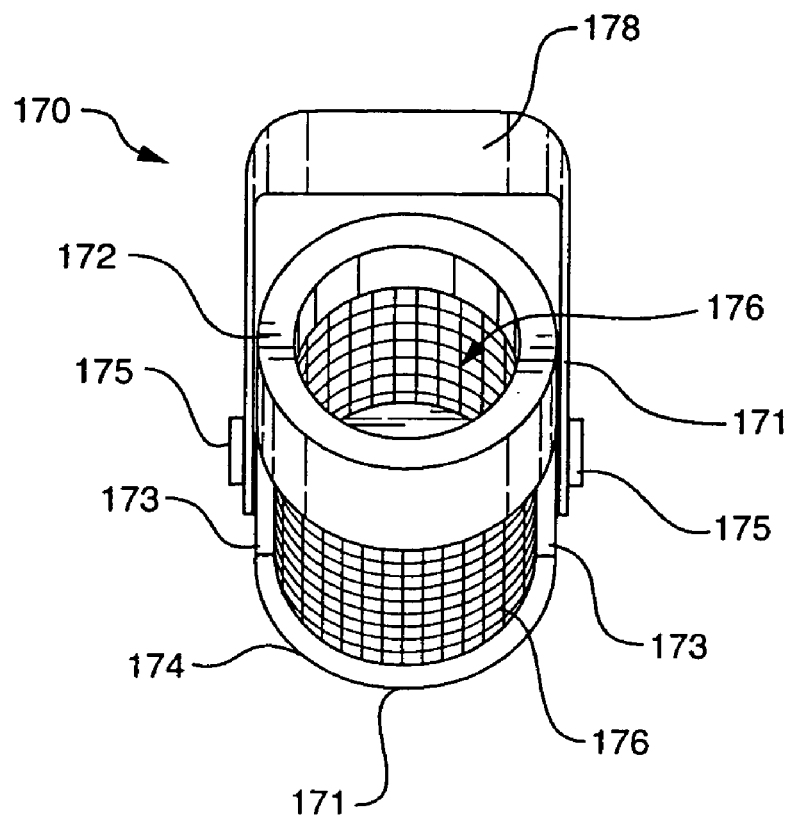
FIGS. 4A-B are oblique top views, rotated 180 degrees relative to one another, of an illustrative filter that may be employed in the cap assembly of FIG. 3.
Figure 4B:
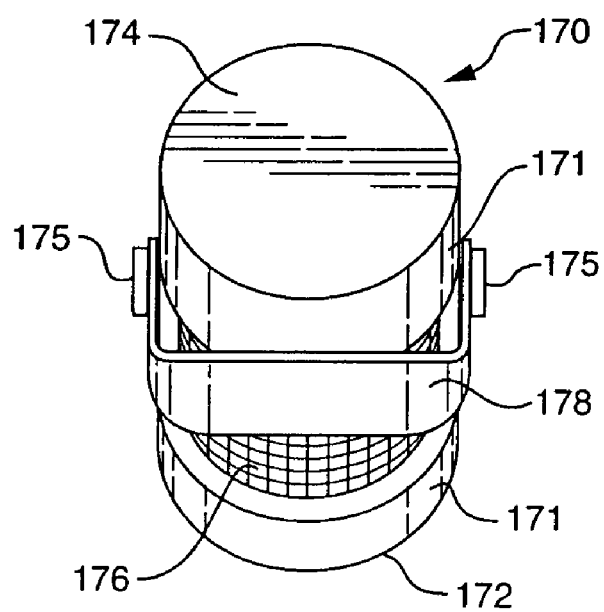

FIGS. 4A-B illustrate the filter 170 in more detail. The filter is substantially cylindrical in shape and includes opposing "open" and "closed" ends 172 and 174. A pair of latitudinal bands 171 is located circumferentially around the filter's open and closed ends. A set of supports 173 extends longitudinally along the outer surface of the filter and connects to the bands 171. The supports 173 and the bands 171 thus define a set of openings in the outer surface of the filter, where a different filter mesh 176 is positioned in each of the openings. Each of the filter meshes may be constructed from various materials, such as plastic or metal strands, and may be molded, embedded or otherwise secured within their respective openings in the filter's outer surface. Further, the meshes' hole sizes are selected so as to block relatively large contaminants, such as heavy metals, dirt, etc., as water flows through the mesh. The handle 178 is rotatably attached to the longitudinal supports 173 by, for example, snapping the handle onto outwardly extending posts 175. The handle is sized to rotate around the filter, as shown in FIGS. 4A-B.

Figure 5A:
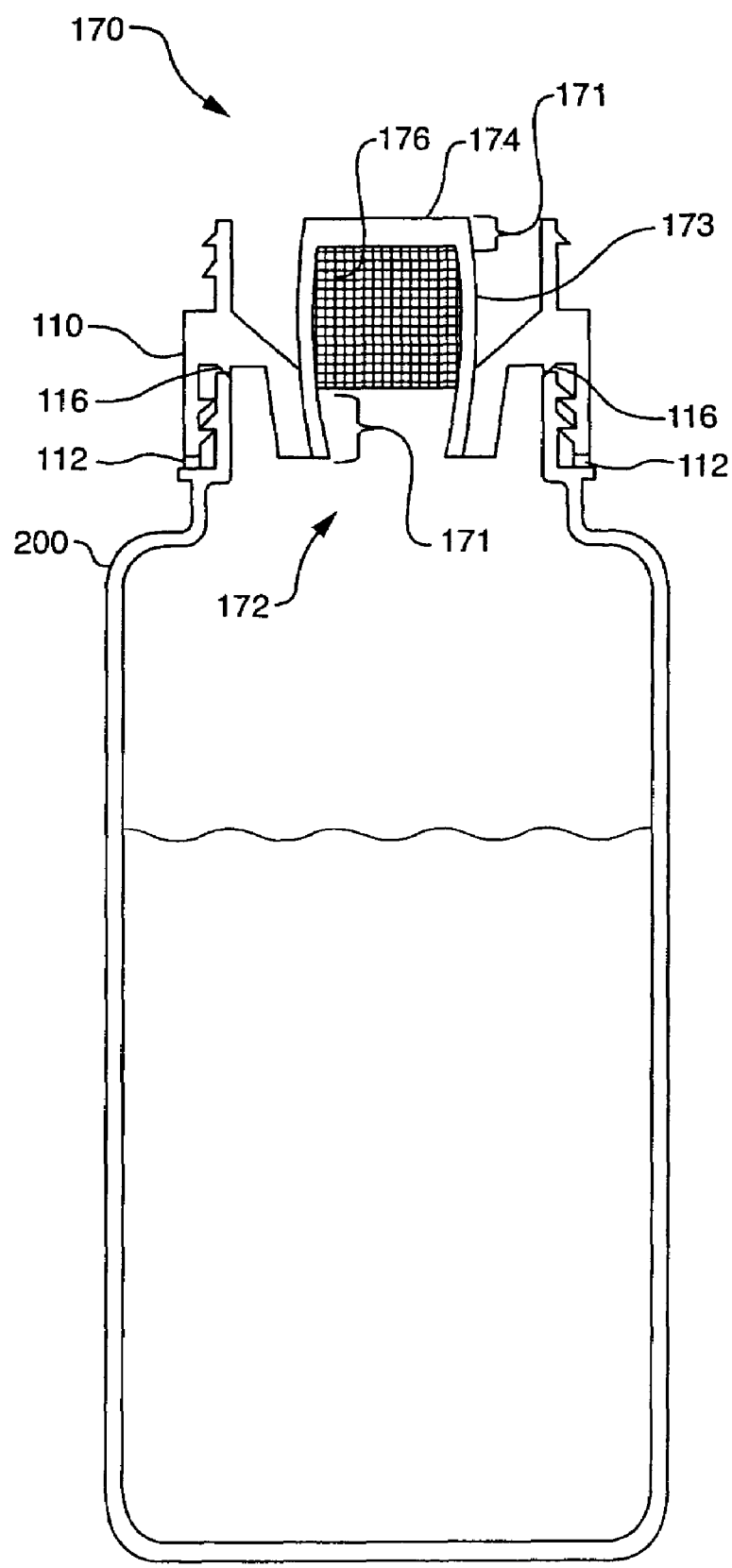
FIG. 5A is a cut away cross-sectional view of the cap assembly engaged with a conventional water storage container in a manner that prevents filtered and/or purified water within the container from becoming re-contaminated.
Figure 5B:
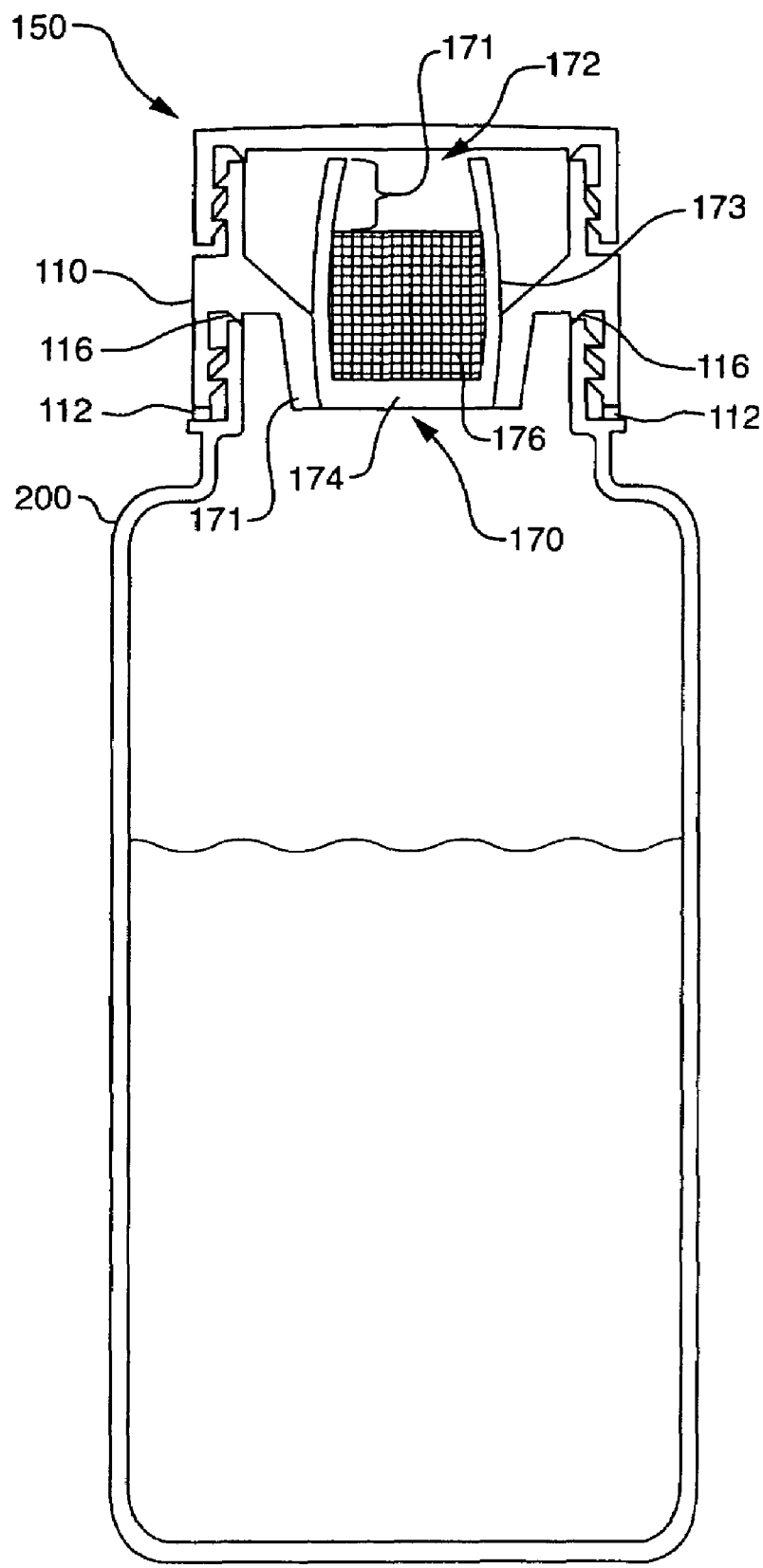
FIG. 5B is a cut away cross-sectional view of the cap assembly engaged with the conventional water storage container in a manner that permits water to filter through the filter and into the body of the container.

FIGS. 5A-B illustrate different orientations by which the cap assembly may be engaged with a conventional water storage container 200. In both orientations, the base 110 is engaged with the storage container, and, as a result, watertight seals are formed above and below the container's inlet, e.g., by the rings 112 and 116. As shown in FIG. 5A, the filter 170 is oriented in the base with its closed end 174 positioned above its open end 172 so water may flow through the filter meshes 176 and into the container 200. For simplicity, the filter's handle 178 is not shown. The filter 170 is preferably secured in the base 110 by pressure fitting the band 171 around the filter's open end 172 in the hole 120 of the base. In this case, the filter meshes 176 extend immediately above the pressure seal. Rather than being pressure fitted, the filter alternatively may be seated on a rim or ledge on the base. Moreover, the filter 170 may be lock-fitted to the base by a twisting motion that engages threads (not shown) on the band 171 with threads (not shown) on the base 110.

In operation, the vertical orientation of the filter meshes 176 permits the meshes to act simultaneously as a vent and a filter. Thus, as water flows through the bottom portions of the meshes, air can escape through the top portions of the meshes, thereby equalizing the air pressure within the storage container 200 as filtered water enters the container. Moreover, when the filter 170 is completely submerged in water, the pressure differential between the top and bottom portions of the meshes 176 permits higher-pressure water at the bottom portions to flow into the storage container while air within the container escapes through the top portions which are at lower pressure.

The filter 170 may be submerged at an angle so that one of the filter meshes 176 is substantially positioned above the other. In this case, the lower mesh filters water entering the container 200 while the upper mesh serves as a vent. If the lower mesh becomes clogged or otherwise obstructed by the filtered impurities, the container 200 may be rotated 180 degrees so the lower filter mesh becomes the upper mesh, and vice-versa. In this rotated position, the clogged filter mesh serves as the air vent, and the out-rushing air clears the clogs. Therefore, as clogging occurs, the storage container can be rotated as needed to allow the filtered water to flow into the container.

Figure 6A:
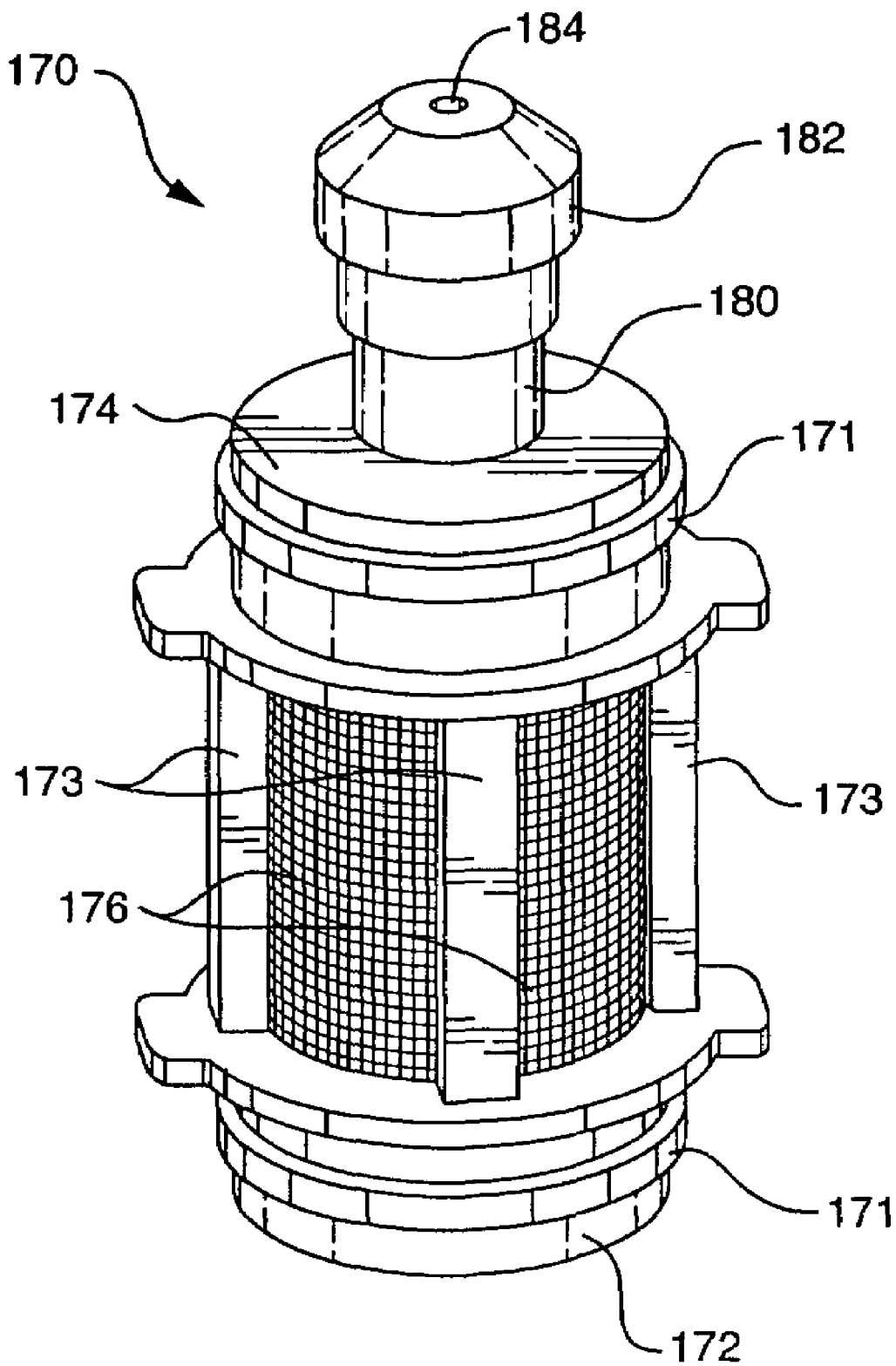
FIGS. 6A-B are oblique side views of an illustrative filter having an air vent that may be adjustably opened and closed.
Figure 6B:
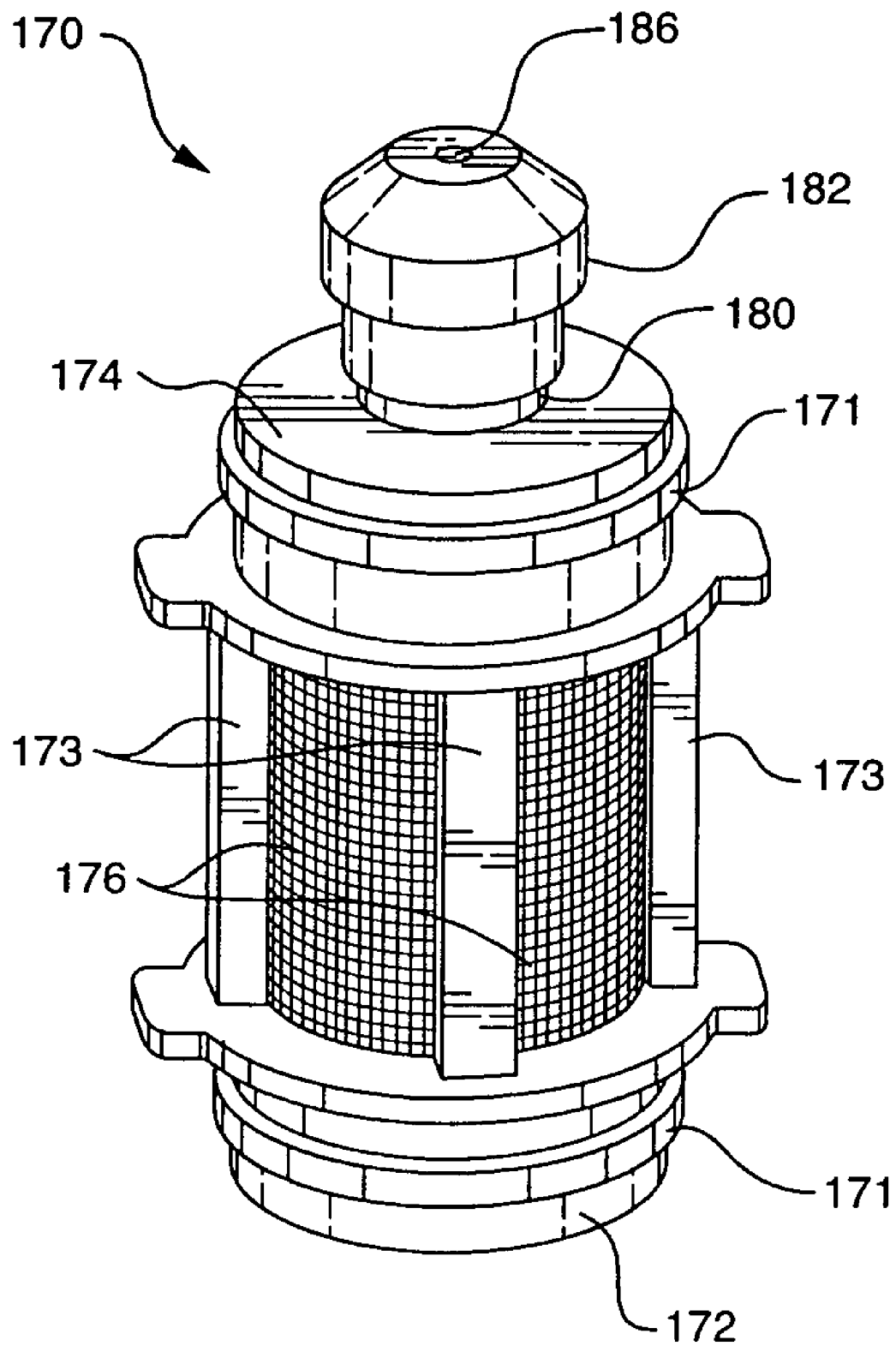

In practice, it is sometimes desirable to select relatively small openings in the filter meshes 176 in order to provide "finer" filtering as water enters the water storage container 200. However, in these cases, the relatively small holes may impede the passage of air from the container 200 when, for example, the container is fully submerged during the water-filling process. To address this, FIGS. 6A-B illustrate an embodiment of the filter 170 which is further adapted to facilitate air passage through the cap assembly 100.

As shown, the filter 170 includes on its closed end 174 an air vent 180 that can be selectively opened and closed. In the embodiment shown in the drawings, a pull valve 182 is included, to open and close the vent. The valve may be lifted in an upwards direction relative to the closed end 174 in order to open the vent and allow air to escape through a hole 184 at the top of the valve (FIG. 6A). Thereafter, the valve 182 may be displaced in a downward direction to close the vent, with a plug 186 situated within the outlet 180 sealing the hole 184 (FIG. 6B). Accordingly, during the water-filling process, the valve may be positioned in its open position to provide a low-resistance path through which air can escape the water storage container 200, even when the container is fully submerged underwater. Then, once the container has been filled, the valve may be depressed and the vent returned to its closed position.

Figure 7:
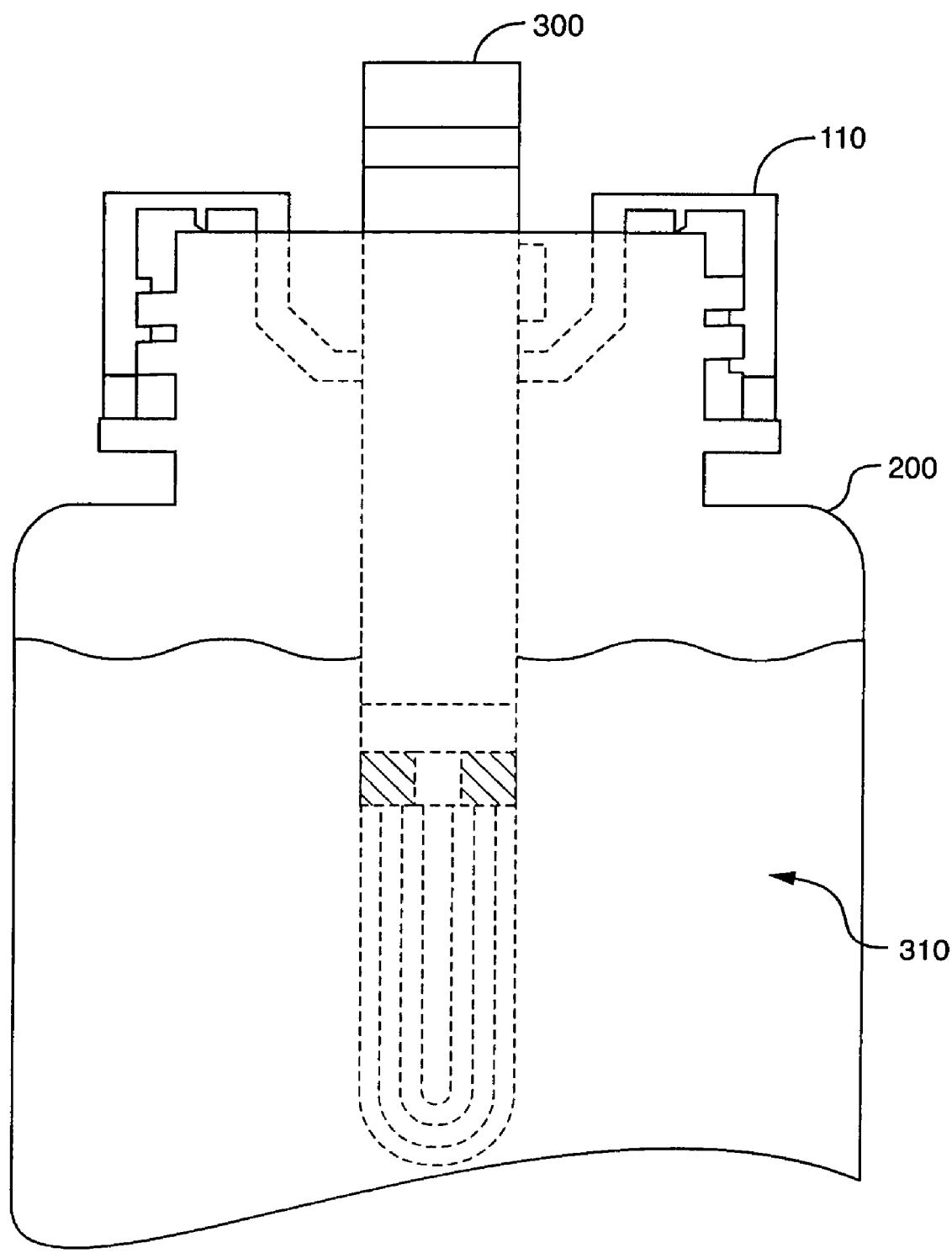
FIG. 7 is a cut away cross-sectional view of an ultra-violet source applied to water stored in the water storage container while the illustrative base is engaged with the container.

After the filtered water has been stored in the storage container 200, the filter 170 is removed and, if desired, the filtered water is disinfected as discussed below with reference to FIG. 7. At this point, the base 110 may be removed and the water accessed, e.g., for drinking or cooking. When the filtered and/or purified water is to be stored in the container 200, the closed end 174 of the filter 170 is wiped clean and the filter is then repositioned in the base 110 as shown in FIG. 5B, such that the filter's closed end 174 is pressure fitted into the base to prevent the filtered and/or purified water within the container from escaping. The filter 170 is preferably secured in the base by pressure fitting the band 171 around the filter's closed end 174 in the hole 120 of the base. Alternatively, the filter may be seated on a rim or ledge on the base or may be threadingly secured to the base. Further, the filter 170 preferably extends to the bottom of the hole 120. The cover 150 engages with the base 110 in a manner that "sandwiches" the filter 170 therebetween.

As discussed, the filter mesh 132 or 176 may not effectively block some biological contaminants, such as bacteria and viruses. Accordingly, the filter 130 or 170 (or if one piece, the base with integrated filter) may be removed so chemical and/or irradiative water treatments can be employed to exterminate any microbes still resident in the filtered water. For instance, the water may be disinfected by chlorine, iodine, etc. supplied through the hole 120. Alternatively, the filtered water may be purified by UV radiation provided by a UV source that is inserted through the hole 120 and into the container 200. A hand-held UV source that may be used in this manner is described in U.S. Pat. No. 5,900,212 to Maiden et al, entitled Hand-Held Ultraviolet Water Purification System, which is hereby incorporated by reference as though fully set forth herein. FIG. 7 illustrates an exemplary hand-held UV source 300 inserted through the base 110 and into water 310 stored in the container 200. In practice, the storage container 200 may be inverted after the UV source is inserted through the base, to ensure that the water level covers a water-level sensor that controls when the UV source can turn on. Further, the inverting ensures that scattered droplets that might otherwise adhere to the sides of the container are fully incorporated into the water for treatment.

After the water storage container 200 is filled with the filtered water and the water is disinfected, as necessary, the base 110 is removed and a person can then safely drink directly from the inlet 210. Specifically, the watertight seals formed by the rings 112 and 116 ensure that no contaminated water contacts the outer surface of the inlet 210 during the water-filling process, even if the container 200 is submerged or partly submerged in the untrusted water. Thus, in contrast to prior filtration systems, no contaminants can adhere to the outer surface of the inlet and threaten the drinker's health if he/she drinks directly from the storage container after the base 110 is removed.

The foregoing has been a detailed description of an illustrative embodiment of the invention. Various modifications and additions can be made without departing from the spirit and scope of the invention. For example, the portable water filtration system may be used to filter other liquids besides (or in addition to) water. In addition, structural elements of the cap 100 may be replaced with their functional equivalents. For instance, although the ring 116 is depicted as a tapered ring molded into the base 110, it alternatively may be embodied as other functionally equivalent structures, such as a rubberized O-ring seated in a groove. Also, the mesh 132 may be implemented having various hole sizes and may be replaced by various porous filter media known in the art. Further, the hole 120 may be a variety of different shapes and sizes positioned approximately at the center of the base 110. The filter 170 may be constructed with or without the handle 178. The ring 112 may seat on the top surface of the body of the container if the flange 212 is is not incorporated with the container. Alternatively, the base may extend over the flange 212 and seal to the surface of the body of the container. Further, the cap may be snap fit onto a container that does not have a threaded inlet. Additionally, the filter may be lock-fitted to the base, e.g., by threadingly securing the filter to the base. Also, the mechanism that selectively opens and closes the air vent 180 may be implemented in other ways besides using the pull valve 182. For instance, an adjustable flap or removable plug alternatively may be used to open and close the vent. Accordingly, this description is meant to be taken only by way of example and not to otherwise limit the scope of the invention.

What is claimed is:

1. A portable filter cap adapted to attach to an inlet of a storage container, the portable filter cap comprising:
   a base element adapted to attach to the inlet of the storage container and isolate an outer surface of the inlet from fluid contact as unfiltered liquid flows into the storage container, the base element having a hole approximately at its center;
   a filter element positioned within the base element, the filter element supporting a mesh in a position to filter the unfiltered liquid as the liquid flows through the base element into the storage container storing filtered liquid; and
   the filter element further includes an air vent that has an open position and a closed position, the vent in the open position allowing air to escape through the vent as the filtered liquid flows into the storage container.

2. The portable filter cap according to claim 1, wherein the portable filter cap is further adapted to receive a cover element.

3. The portable filter cap according to claim 2, wherein the cover element is threadingly secured to the base element.

4. The portable filter cap according to claim 1, wherein the mesh aligns with the hole in the base element when the filter element is positioned within the base element.

5. The portable filter cap according to claim 1, wherein the base element and the filter element are integrated into a single component.

6. The portable filter cap according to claim 1, wherein the base element isolates the outer surface of the inlet from fluid contact by forming separate watertight pressure seals above and below the isolated outer surface of the inlet.

7. The portable filter cap according to claim 6, wherein one of the watertight pressure seals is formed against a flange located near the base of the inlet and the other watertight pressure seal is formed against a top surface of the inlet.

8. The portable filter cap according to claim 7, wherein a rubberized O-ring forms the watertight pressure seal against the flange.

9. The portable filter cap according to claim 7, wherein a molded ring in the base element forms the watertight pressure seal against the top surface of the inlet.

10. The portable filter cap according to claim 1, wherein the base element is threadingly secured to the outer surface of the inlet.

11. An apparatus for filtering water as the water enters an inlet of a water storage container, the apparatus comprising:
    means for isolating an outer surface of the inlet of the water storage container from fluid contact as unfiltered water flows into the water storage container, wherein the means for isolating the outer surface is adapted to attach to the inlet of the water storage container;
    means for filtering impurities from the water as the water enters the inlet of the water storage container from outside of the container the filtering means providing filtered water for storage within the water storage container, wherein the means for filtering is positioned within the means for isolating; and
    means for venting air from within the storage container while the water enters the inlet of the water storage container, the means for venting having an open and a closed position and operating in the open position to vent the air.

12. The apparatus according to claim 11, further comprising:
    means for removing biological contaminants from the water after the water has been filtered and collected in the water storage container.

13. A portable filter cap adapted to attach to an inlet of a storage container, the portable filter cap comprising:
    a base element that attaches to the inlet of the storage container in a manner that isolates an outer surface of the inlet from fluid contact as unfiltered liquid flows from outside the storage container into the storage container, the base element having a hole approximately at its center and being adapted to receive a filter element; and
    the filter element being adapted to be received in the base element and positioned in a first orientation within the base element, the filter element having
        a first end that is open and aligns with the hole in the base element when the filter is positioned in the base element,
        a second end that includes an air vent that has an open position and a closed position and when in the open position allows air to vent from the storage container when liquid is flowing from outside the storage container into the storage container, the air vent aligning with the hole in the base element when the filter is positioned in the base element, and side openings in which mesh is positioned to filter the liquid as it flows from outside the storage container through the side openings and into the storage container to allow the storage container to store filtered liquid.

14. The portable filter cap according to claim 13, wherein the portable filter cap is further adapted to receive a cover element.

15. The portable filter cap according to claim 14, wherein the cover element is threadingly secured to the base element.

16. The portable filter cap according to claim 13, wherein the base element isolates the outer surface of the inlet from fluid contact by forming separate watertight pressure seals above and below the isolated outer surface of the inlet.

17. The portable filter cap according to claim 16, wherein one of the watertight pressure seals is formed against a flange located near the base of the inlet and the other watertight pressure seal is formed against a top surface of the inlet.

18. The portable filter cap according to claim 17, wherein a rubberized O-ring forms the watertight pressure seal against the flange.

19. The portable filter cap according to claim 17, wherein a molded ring in the base element forms the watertight pressure seal against the top surface of the inlet.

20. The portable filter cap according to claim 13, wherein the base element is threadingly secured to the outer surface of the inlet.

21. The portable filter cap according to claim 13, wherein the air vent is selectively opened and closed by displacing a pull valve attached to an outer surface of the air vent.

22. The portable filter cap according to claim 13, wherein the filter element is removed and inserted in a second orientation into the base element with the air vent in a closed position to seal the hole in the base element and prevent liquid from flowing out of the base element.

23. A portable filter cap adapted to attach to an inlet of a storage container, the portable filter cap comprising:
    a base element attached to the inlet of the storage container to isolate an outer surface of the inlet from fluid contact as unfiltered liquid flows from outside the storage container into the storage container, the base element having a hole approximately at its center; and a filter element removably positioned within the base element, the filter element supporting a mesh in a position to filter the unfiltered liquid as the liquid flows from outside the storage container through the base element and as a filtered liquid into the storage container for storage, the filter element further including an air valve with open and close positions, the air valve being selectively open to allow air to escape when the filter element is positioned in the base element in a first orientation while the unfiltered liquid is filtered through the mesh.

24. The portable filter cap according to claim 23, further comprising:

a ultra-violet (UV) radiation source positioned within the base element after removing the filter element, the UV radiation source to eliminate biological contaminants in the filtered liquid.

25. The portable filter cap according to claim 23, wherein the filter element is adapted to be removed from the base element and placed in a second orientation that is 180 degrees from the first orientation with the air valve closed and a lateral band around the filter element sealing the hole in the base element.

26. The portable filter cap according to claim 23, wherein the filter element is locked by rotating the filter element within the base element in the first orientation.

27. The portable filter cap according to claim 23, wherein a lateral band around a first end of the filter element seals between the filter element and the base element when in the first orientation.

28. The portable filter cap according to claim 13, wherein the base element is adapted to receive a removable filter element.

* * * * *